United States Patent
Fletcher et al.

[11] 3,864,542
[45] Feb. 4, 1975

[54] GRAIN REFINEMENT CONTROL IN TIG ARC WELDING

[76] Inventors: James C. Fletcher, Administrator of the National Aeronautics and Space Administration with respect to an invention by; William F. Iceland, 11711 Reagan St., Los Alamitas, Calif. 90720; Edwin L. Whiffen, 1019 Verona Dr., Fullerton, Calif. 92635

[22] Filed: Nov. 13, 1973

[21] Appl. No.: 415,486

[52] U.S. Cl. ............................................. 219/137
[51] Int. Cl. ............................................. B23k 9/00
[58] Field of Search ........ 219/130, 131 WR, 131 R, 219/135, 137, 128

[56] References Cited
UNITED STATES PATENTS

| | | | |
|---|---|---|---|
| 3,182,178 | 5/1965 | Libby | 219/130 |
| 3,487,194 | 12/1969 | Poulton et al. | 219/128 |
| 3,781,511 | 12/1973 | Rygiol | 219/135 |

*Primary Examiner*—C. L. Albritton
*Assistant Examiner*—Clifford C. Shaw
*Attorney, Agent, or Firm*—Marvin J. Marnock; Marvin F. Matthews; John R. Manning

[57] ABSTRACT

A method for controlling grain size and weld puddle agitation in a tungsten electrode inert gas welding system to produce fine, even grain size and distribution is disclosed. In the method the frequency of DC welding voltage pulses supplied to the welding electrode is varied over a preselected frequency range and the arc gas voltage is monitored. At some frequency in the preselected range the arc gas voltage will pass through a maximum. By maintaining the operating frequency of the system at this value, maximum weld puddle agitation and fine grain structure are produced.

5 Claims, 2 Drawing Figures

GRAIN REFINEMENT CONTROL IN TIG ARC WELDING

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

This invention concerns electric arc welding in an inert gas atmosphere and, more particularly, a method for monitoring and controlling the frequency of DC pulse welding voltages in such a system to produce a fine grain structure in the welded material.

DESCRIPTION OF THE PRIOR ART

In aircraft, missiles, and space vehicles there is a need for welding methods for providing fusion welding of small diameter metallic tubing of materials such as aluminum or stainless steel in systems used to transport liquids and gases within these vehicles. The fusion welding of such thin wall tubing has presented problems in the prior art due to many reasons. For example, U.S. Pat. No. 3,522,412 discloses a method for welding tubing in such applications wherein a very slow rate of pulsation of the welding current is used to prevent internal beading (melting of the material to form a protrusion on the internal walls) of a section of tubing joined in this manner. Similarly, U.S. Pat. No. 3,632,960 discloses a complex welding system wherein pulsed DC voltages of controlled duration are applied to the welding electrode to provide a means for preventing overheating damage to adjacent areas of the tubing material. In this technique certain welding parameters are monitored and compared against a theoretical model by an analog or digital computing system in order to provide the necessary comparison for developing a feedback signal to control the pulse duration of the DC welding voltage.

In other systems known in the prior art the portions of the material being welded have been mechanically agitated, sometimes by imparting sonic energy to the tubing members during the welding operation for this purpose. This has been done to provide so-called "puddle agitation" to the molten puddle of metal present at the juncture between the welding electrode and the tubing portions being welded.

One of the problems occurring in the welding of tubing sections of thin walled tubing used in these applications in the past has been the tendency of the weld joint to crack after the welding operation is complete. This unreliability is usually due to the grain structure of the weld being irregular. If too coarse a grain structure is present a smooth transition from one tubing section to the other is not provided by the weld. As previously stated, various mechanical means have been employed in the prior art to achieve a more uniform grain structure in the weld by imparting mechanical agitation to the "puddle" which occurs at the juncture of the welding electrode and the tubing sections being welded. Such systems have had less than perfect success due to the fact that it is difficult to impart such mechanical agitation efficiently and at a high enough frequency to preserve the puddle agitation sought. Moreover such mechanical agitation methods are complicated due to the necessity of the use of piezoelectric transducers or the like for coupling high frequency mechanical or sonic energy to the members being welded.

Accordingly, it is an object of the present invention to provide a simple and efficient method for welding thin walled tubing materials in an inert gas atmosphere which achieves maximum weld puddle agitation.

Another object of the invention is to provide a method for achieving a finer and more uniform grain structure across the weld in a system for welding thin walled tubing sections in an inert gas atmosphere.

A still further object of the present invention is to provide an electronically operable method for providing uniform grain structure across the weld sections in thin walled tubing by achieving maximum weld puddle agitation without the physical coupling of mechanical energy to the welding welded members.

BRIEF DESCRIPTION OF THE INVENTION

The above and other objects, features and advantages of the invention are provided in a method for operating a tungsten inert gas (TIG) arc welding system to provide grain refinement control of the granular structure of the weld zone between two sections of thin-wall tubing. According to the method of the invention the frequency of DC welding voltage pulses applied to the tungsten electrode is slowly varied over a predetermined range of frequencies. While this frequency variation of the DC welding voltage is being accomplished the arc gas voltage (the voltage across the electric arc) formed in the inert gas atmosphere is monitored on a cathode ray oscilloscope. By obsesrvation (or by remote sensing means, if desired) a maximum of arc gas voltage variation versus pulse frequency is determined. When the system is operated at the frequency of DC pulses occurring at this maximum arc gas voltage variation, the most uniform grain and maximum weld puddle agitation is achieved.

Other objects, features and advantages of the method of the present invention will be apparent from the following detailed description thereof. The invention is best understood by reference to the following detailed description when taken in conjunction with the appended drawings in which:

DESCRIPTION OF THE PREFERRED EMBODIMENT

It is known from metallurgical studies that the uniformity or strength of a weld between two pieces of similar material is directly related to the grain size and uniformity of grain structure of the weld. The smaller the grain size, and the more uniform distribution of small sized grains, the stronger and less brittle such a weld will be. It has also been known in the prior art that the grain size of metallic particles in such a weld is directly related to the amount of weld puddle agitation present when the welding process is taking place.

The weld puddle is the pool of molten metal which exists in the heated portion of the members being welded wherein the members being welded actually melt and form a liquid phase in the presence of the electric arc. In the past it has been sought to promote weld puddle agitation by mechanical means. The coupling of vibrational transducers to the members being welded to impart mechanical energy or vibratory energy from the members into the weld puddle has been utilized for this purpose. U.S. Pat. No. 3,487,194 for example, illustrates a welding apparatus having a sonic transducer coupled in the vicinity thereof for this purpose.

In some applications of welding thin walled tubing of materials such as aluminum or titanium, for example for use in spacecraft or aircraft applications, a technique such as that described in the foregoing U.S. Patent has proven to be impractical due to the fact that the welding of such materials as aluminum require the use of an inert gas atmosphere. The inert gas atmosphere is usually provided by isolating the area being welded in a closed container and providing the introduction or flow through of an inert gas such as helium in the vicinity where the weld is taking place. The provision of the chamber or sleeve which is filled with the inert gas would therefore render difficulty in acoustically coupling the necessary mechanical energy in a system such as that disclosed in the aforementioned patent. Similarly, the coupling of mechanical energy along the members being welded themselves by means of vibrational transducers, is not desirable since this can sometimes impart movement between the members being welded if the agitation is too violent and therefore weaken rather than strengthen the weld seam.

In view of these above cited difficulties with prior art systems for controlling the grain size and structure of the weld seam, it is apparent that it would be highly desirable in applications where extremely reliable weld seams are required, such as aircraft and spacecraft application, that some technique for more accurately controlling the grain size and uniformity in the welded zone be made available. Such a method is provided in the present invention.

Figure 2:
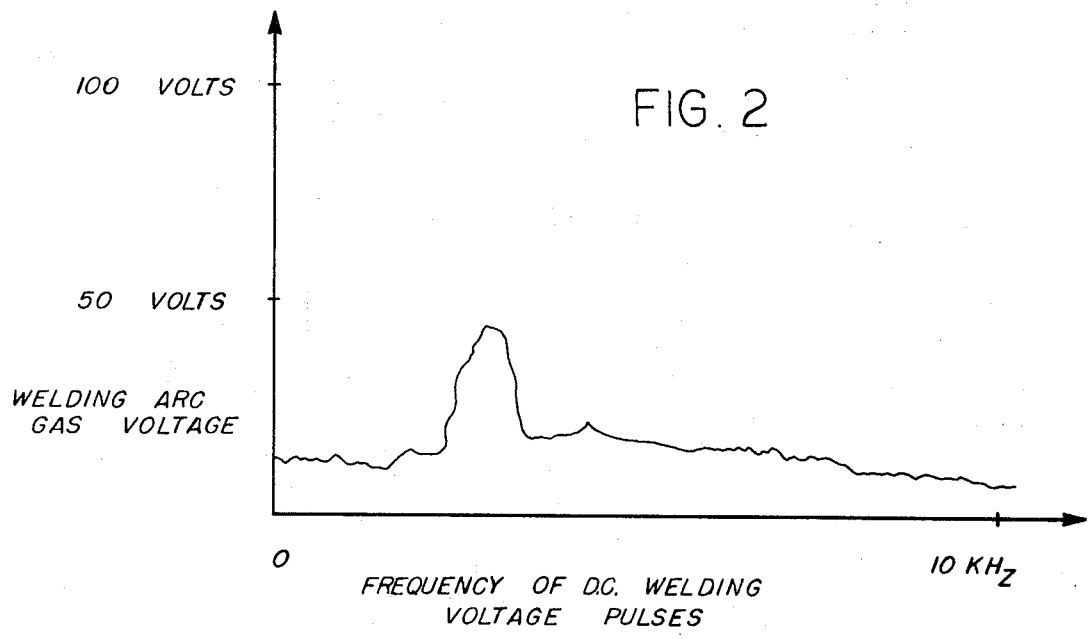
FIG. 2 is a graphical representation illustrating the arc gas voltage variation as monitored by an arrangement such as that shown in FIG. 1 plotted as a function of frequency of the DC welding pulses applied to the tungsten electrode over a range of frequencies from 0 to 10 kilohertz.

Referring initially to FIG. 2 a graphical representation illustrating the amplitude of welding arc gas voltage variations as a function of the frequency of DC voltage pulses of constant duration applied between the tubing members to be welded and the welding electrode is illustrated. It will be noted with respect to FIG. 2 that the average arc gas voltages go through a maximum if the frequency of the DC pulses applied is varied between 0 and 10 kilohertz. It has been found in practice by the applicants that at some frequency in this range (which frequency may vary according to the thickness of the tubing, the type of inert gas being used and the current within the arc) that these arc gas voltage variations will go through some maximum value. It has further been found that if the welding power supply is then operated at the frequency which produces this maximum arc gas voltage variation that the most uniform and fine grain structure is achieved in the welded zone between two sections of tubing. It has also been observed that the maximum weld puddle agitation occurs at the frequency which produces this maximum in arc gas voltage vs. operating frequency graph.

Accordingly, in the method of tungsten electrode, inert gas welding of thin walled tubing sections of the present invention a more uniform welded zone than heretofore producable by prior art techniques is achieved by commencing the welding operation with a variable frequency DC pulse welding power supply and by varying the frequency of the DC pulses supplied to the welding electrode over the frequency range from zero to approximately 10 kilohertz. Simultaneous with this variation of frequency of the DC voltages supplied to the welding electrode, the arc gas voltage (the voltage between the welding electrode and the members being welded) is monitored, for example by cathode ray oscilloscope. The welding operator then observes on the cathode ray oscilloscope the frequency which produces the maximum in the arc gas voltage variation. When the maximum arc gas voltage as a function of frequency is observed, the remainder of the welding operation is performed with the welding power supply set at this frequency. In this manner a more uniform and finer grained weld seam is produced than heretofore has been accomplished in the prior art and without the aforementioned undue difficulties caused by mechanical agitation of the weld puddle.

Figure 1:
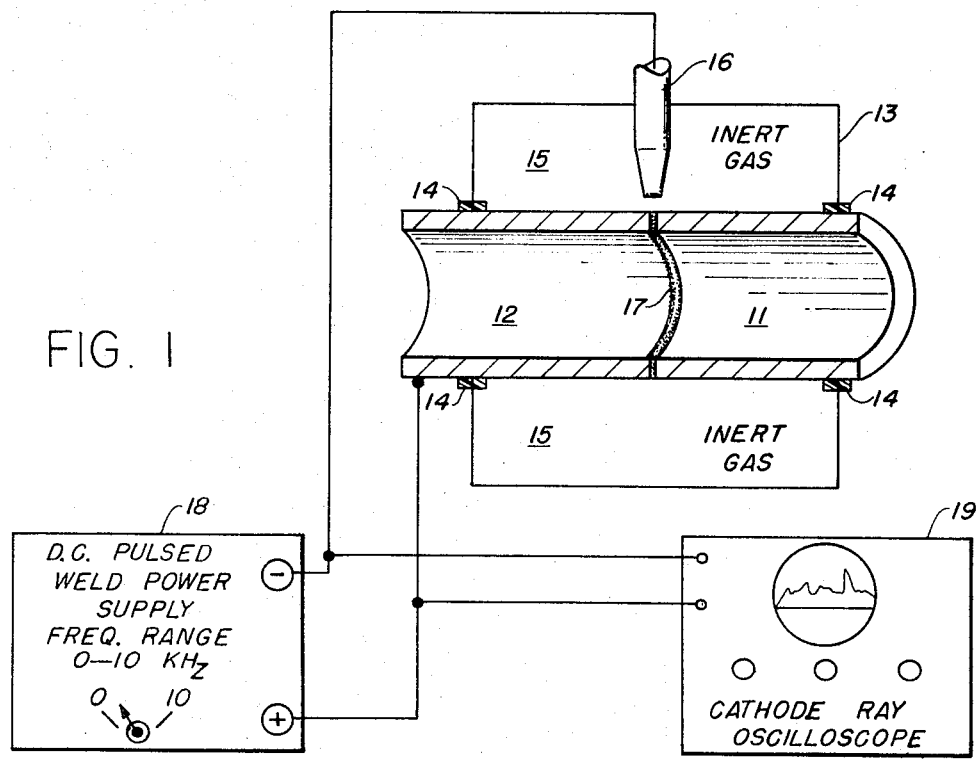
FIG. 1 is a schematic diagram illustrating a tungsten electrode inert gas welding system for welding sections of thin walled aluminum tubing with an arc gas voltage monitoring arrangement in accordance with the concepts of the invention.

Referring now to FIG. 1, a typical apparatus set up for performing the method of the present invention is illustrated schematically. Two tubing sections, 11 and 12 of relatively thin walled aluminum tubing are depicted in perspective cross-sectional view. The two tubing sections are enclosed by a sleevelike enclosure 13 which is provided at its contacting surfaces with sealing means 14 and whose interior portion 15 is filled with an inert gas. If desired, the inert gas may be continuously circulated inside the shielding member 13 from a conventional gas circulation system (not shown). The welding electrode 16, usually composed of tungsten or the like, is aligned with the end portions of the members 11 and 12 being welded in the area 17 where the weld seam is to be produced. The electrode 16 is slowly rotated about the circumference of the tubing sections 11 and 12 during the welding process to produce the weld over their entire circumference. One or more passes of the electrode 16 about the tubular members 11 and 12 may be required for this purpose.

A variable frequency DC pulsed weld power supply 18, which for example may comprise a 200 ampere supply such as that supplied by the Rytek Corporation of Santa Fe Springs, Calif., may be used for this purpose. This power supply furnishes pulsed DC voltages of constant pulse duration and having a variable frequency of occurrence from zero to 10 kilohertz at peak currents of up to 200 amps. The negative terminal of the DC pulsed weld power supply 18 is connected to the welding electrode 16 while the positive terminal of the power supply 18 is connected to the tubing sections 11 and 12 being welded.

Additionally, the negative terminal of the DC pulsed weld power supply 18 is connected to one input of a cathode ray oscilloscope 19, of conventional design and having a frequency response of at least zero to 10 kilohertz. The opposite input terminal of the oscilloscope 19 is connected to the two members 11 and 12 being welded. This arrangement allows the arc gas voltage in the weld zone 17 to be monitored by the oscilloscope 19.

In operation, the frequency of the DC pulses supplied to the electrode from the welding supply 18 are varied from an initial frequency of near zero pulses/sec. to approximately 10 kilohertz by the welding operation. While doing this, the operator observes the arc gas voltage variations on the oscilloscope 19. At some frequency in the arc gas voltage will increase through a maximum value as depicted in FIG. 2 and then decline. The remainder of the welding operation is then carried out by the operator at the frequency of the maximum in the arc gas voltage vs. frequency of pulse curve of FIG. 2 to produce the desired maximum weld puddle agitation and fine, uniform grain structure across the weld seam 17.

It will be apparent to those skilled in the art that variations in the above method could be made and still fall under the inventive concepts of the invention. For example, circuitry could be provided to automatically sweep the frequency of the weld pulse generator 18 across the desired frequency range and to select the frequency of maximum arc gas voltage variation and lock in on this frequency as an operating frequency. Other types of sensors than a cathode ray oscilloscope could be used to monitor the arc gas voltage variation with pulse frequency. If the frequency of maximum variation of arc gas voltage is known approximately beforehand, the frequency range of swept frequencies could be reduced. Similarly, the observation of the frequency producing maximum arc gas voltage variation could be made at several points along the periphery of the weld, or even continuously as the welding proceeds, if automatic circuitry is provided, and the operating frequency adjusted to maximize this parameter continuously. It is the aim in the appended claims to cover all such changes and modifications of the disclosed method as fall within the true spirit and scope of the invention.

We claim:

1. A method for controlling grain size and weld puddle agitation in an inert gas atmosphere welding operation, comprising the steps of:

supplying DC voltage pulses between a welding electrode and a pair of members to be welded in the presence of an inert gas atmosphere, said DC voltage pulses being of equal time duration;

sensing the voltage in the electric arc formed in said inert gas between said electrode and said member being welded;

varying the operating frequency of said DC voltage pulses from a lower frequency to a higher frequency over a preselected frequency range;

selecting the frequency in said preselected frequency range which produces a maximum value of said sensed arc gas voltage; and maintaining the operating frequency at said selected frequency producing said maximum value of arc gas voltage to thereby produce maximum weld puddle agitation and fine, uniform grain size in the weld zone.

2. The method of claim 1 wherein the step of sensing the voltage in the electric arc formed in said inert gas is performed by monitoring said voltage on a cathode ray oscilloscope having a frequency response characteristic sufficiently broad to cover said preselected frequency range.

3. The method of claim 1 wherein the step of varying the operating frequency of said DC voltage pulses is performed by varying said operating frequency in the preselected frequency range of zero to 10 kilohertz.

4. The method of claim 1 wherein all the steps are performed at a plurality of points along the juncture of said members being welded.

5. The method of claim 1 wherein said welding system employed is a tungsten electrode inert gas welding system.

* * * * *